US008717372B1

(12) United States Patent
Wyatt (10) Patent No.: US 8,717,372 B1
(45) Date of Patent: May 6, 2014

(54) TRANSITIONING BETWEEN OPERATIONAL MODES IN A HYBRID GRAPHICS SYSTEM (75) Inventor: David Wyatt, San Jose, CA (US)

(73) Assignee: NVIDIA Corporation, Santa Clara, CA (US)

( * ) Notice: Subject to any disclaimer, the term of this patent is extended or adjusted under 35 U.S.C. 154(b) by 1162 days.

(21) Appl. No.: 12/326,055

(22) Filed: Dec. 1, 2008

(51) Int. Cl.
G06F 15/16 (2006.01)
G06F 1/32 (2006.01)
G06F 9/46 (2006.01)

(52) U.S. Cl.
USPC ............................ 345/502; 713/320; 718/105

(58) Field of Classification Search
USPC ............................ 345/502; 713/320, 32, 203; 718/105–106
See application file for complete search history.

(56) References Cited

U.S. PATENT DOCUMENTS 5,664,201 A * 9/1997 Ikedea ........................... 713/320
6,631,474 B1 10/2003 Cai et al.
2002/0140854 A1* 10/2002 Lan ............................... 348/448
2003/0061383 A1 3/2003 Ziika
2005/0076254 A1 4/2005 Robinson et al.
2007/0283175 A1* 12/2007 Marinkovic et al. .......... 713/320
2008/0034238 A1* 2/2008 Hendry et al. ................ 713/323

OTHER PUBLICATIONS

Office Action, U.S. Appl. No. 12/326,053 dated Jun. 6, 2012.

* cited by examiner

Primary Examiner — Xiao M. Wu
Assistant Examiner — Yingchun He
(74) Attorney, Agent, or Firm — Patterson & Sheridan, LLP (57) ABSTRACT A method for transitioning from a first operational mode, where operations are executed on a first processor while a second processor is powered off, to a second operational mode, where operations are executed on the second processor while the first processor is powered off. A driver causes detects a first system event that indicates a transition from the first to the second operational mode is likely. The driver powers on the second processor in response to the first system event and detects a second system event. The driver determines whether each of the client applications can be transferred from the first processor to the second processor without resulting in any data loss, and depending on whether each of the client applications can be transferred, either transfers the client applications from the first to the second processor or continues to cause the operations to be executed in the first operational mode.

18 Claims, 6 Drawing Sheets

TRANSITIONING BETWEEN OPERATIONAL MODES IN A HYBRID GRAPHICS SYSTEM

BACKGROUND OF THE INVENTION

1. Field of the Invention

The present invention relates generally to the field of graphics processing and more specifically to transitioning between operational modes in a hybrid graphics system.

2. Description of the Related Art

In conventional computing systems, the processing power of a central processing unit (CPU) may be supplemented using a co-processor, such as a graphics processing unit (GPU). GPUs are specialized processors that are configures to efficiently perform graphics processing operations normally performed by the CPU. GPUs may be used to offload some of the processing workload of the CPU. Conventional computing systems may also be configured with a hybrid graphics system that has multiple GPUs, including, for example, an integrated GPU (iGPU) located on the motherboard with the CPU and a discrete GPU (dGPU) located on an add-in card that is connected to the computing system via a Peripheral Component Interconnect Express (PCI Express or PCIe) expansion bus and slot.

In a hybrid graphics system, the iGPU and the dGPU operate in concert to perform graphics processing operations. The iGPU is generally sufficient for ordinary graphics processing tasks, such as web browsing, video playback, and the like. Other graphics-intensive operations, including three-dimensional (3D) rendering and video gaming, are better performed by the dGPU. The dGPU supplements the iGPU by providing the graphics processing capabilities necessary for many of these graphics-intensive applications. However, a typical dGPU generally consumes more power than a typical iGPU due to chip leakage, extra local memory, the use of an intermediary bus (such as a PCIe), dedicated voltage regulation, cooling systems, and the like. Consequently, the improved processing capability offered by a conventional hybrid graphics system is offset by higher overall power consumption compared to using an iGPU alone. However, not all user operations or applications require the use of both the iGPU and the dGPU. For example, when a user is browsing a website, the high performance processing capabilities of the dGPU are generally not required. Using conventional techniques, the dGPU continues to consume power, even when graphics-intensive operations are not required. In this situation, the hybrid graphics system consumes power unnecessarily and generates excessive heat.

In addition, the relatively high-power consumption of the dGPU is especially problematic when a hybrid graphics system is implemented on a laptop computer. As is known, the running time of the laptop computer is limited by battery life. Performing graphics processing using both an iGPU and a dGPU increases power consumption and reduces this running time when the laptop computer is operating using battery power.

Accordingly, there remains a need in the art for a more efficient technique to manage the cooperation of an iGPU and a dGPU in a hybrid graphics system.

SUMMARY OF THE INVENTION

Embodiments of the invention provide a method for transitioning a computing device from a first operational mode, where operations are executed on a first processor while a second processor is powered off, to a second operational mode, where operations are executed on the second processor while the first processor is powered off. A hybrid driver causes operations associated with client applications to be executed in the first operational mode and detects a first system event that indicates a transition from the first to the second operational mode is likely. The hybrid driver powers on the second processor in response to the first system event and detects a second system event that signals the transition from the first to the second operational mode. The hybrid driver determines whether each of the client applications can be transferred from the first processor to the second processor without resulting in any data loss, and depending on whether each of the client applications can be transferred, either transfers the client applications from the first to the second processor or continues to cause the operations to be executed in the first operational mode.

Advantageously, the hybrid driver provides the dual capability of high-performance graphics processing and efficient power management.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. The appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the invention. However, it will be apparent to one of skill in the art that the invention may be practiced without one or more of these specific details. In other instances, well-known features have not been described in order to avoid obscuring embodiments of the invention.

Figure 1:
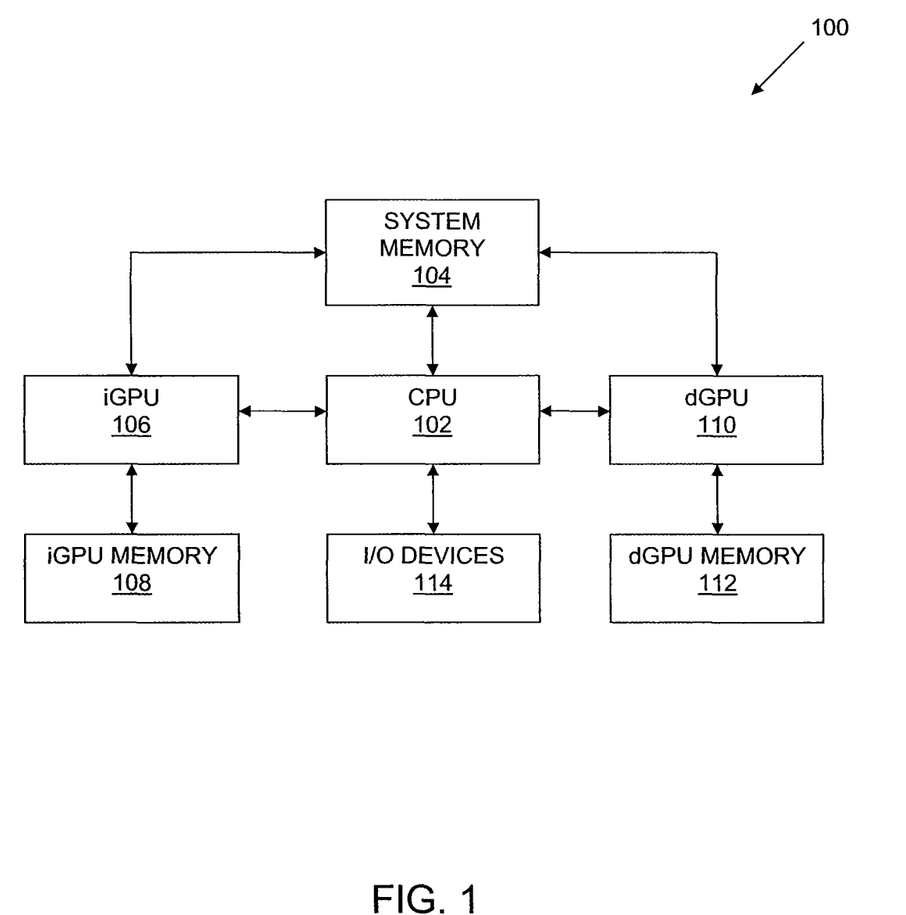
FIG. 1 is a block diagram of a computing system configured to implement one or more aspects of the invention.

FIG. 1 is a block diagram of a computing system 100 configured to implement one or more aspects of the invention. As shown, the computing system 100 includes a CPU 102, a system memory 104, an iGPU 106, an iGPU memory 108, a dGPU 110, a dGPU memory 112, and input/output (I/O) devices 114. The CPU 102 is connected to system memory 104. System memory 104 may be a hard disk drive, a RAM module, a flash drive, a database, or another type of memory unit. System memory 104 is configured to store instructions that are read and executed by the CPU 102, the iGPU 106, and/or the dGPU 110.

The iGPU 106 is connected to the CPU 102 via one or more bridges that may include a memory bridge, I/O bridge, and/or switch. iGPU 106 is coupled to iGPU memory 108. iGPU 106 is integrated directly on the motherboard along with CPU 102 and provides graphics processing functionality to act as a co-processor to the CPU 102. iGPU 106 is configured to read data from the iGPU memory 108 and/or from system memory 104, where the data may include executable instructions that configure the iGPU 106 for different processing tasks. Additionally, iGPU 106 is configured to write data to iGPU memory 108 or to system memory 104, where the data may include graphics data and/or other types of data.

The dGPU 110 is similarly connected to the CPU 102 via one or more bridges that may include a memory bridge, I/O bridge, and/or switch. dGPU 110 is coupled to dGPU memory 112. The dGPU 110 is located on an add-in card connected to the computing system 100 via a PCIe expansion bus and slot, and provides higher-precision graphics processing capabilities than the iGPU 106. dGPU 110 is configured to read data from the dGPU memory 112 and/or from system memory 104, where the data may include executable instructions that configure the dGPU 110 for different processing tasks. Additionally, dGPU 108 is configured to write data to dGPU memory 112 and/or to system memory 104, where the data may include graphics data or other types of data.

One or more I/O devices 114 are also similarly connected to CPU 102 via one or more bridges that may include a memory bridge, I/O bridge, and/or switch. I/O devices 114 may include input devices, such as a keyboard, a mouse, a touchpad, a microphone, a video camera, a sensor, a multi-state or single-state switch, a button, a toggle, or a slider, and the like. I/O devices 114 may be used to input data to the CPU 102, iGPU 106, and/or dGPU 110. I/O devices 114 may also include output devices, such as a cathode-ray tube (CRT) monitor, a video graphics array (VGA) monitor, a liquid crystal display (LCD), or a speaker, among others, and may be used to output data processed by CPU 102, iGPU 106, and/or dGPU 108.

In one embodiment, the computing system 100 is under the control of the CPU 102 and is configured to perform graphics processing as well as other operations using the iGPU 106 and the dGPU 110 as co-processors. Accordingly, system memory 104 may include instructions that, when executed by CPU 102, allow CPU 102 to manage the operation of iGPU 106 and dGPU 110.

Figure 2:
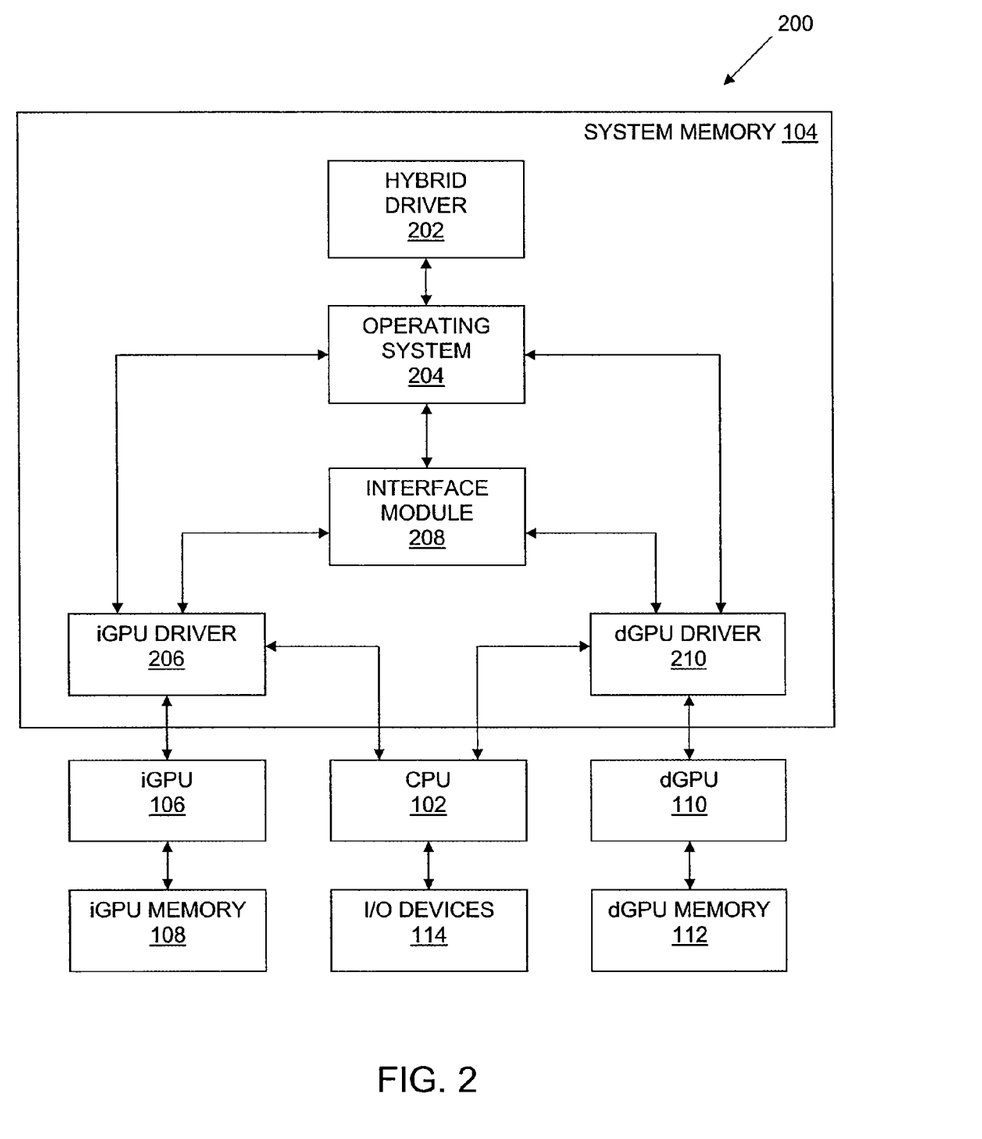
FIG. 2 is a block diagram of a hybrid graphics system, according to one embodiment of the invention.

FIG. 2 is a block diagram of components of a hybrid graphics system 200, according to one embodiment of the invention. As shown, hybrid graphics system (HGS) 200 includes system memory 104, which includes a hybrid driver 202, an operating system (OS) 204, an iGPU driver 206, an interface module 208, and a dGPU driver 210.

The hybrid driver 202 is configured to communicate with OS 204. Hybrid driver 202 is also configured to coordinate the operation of the iGPU 106 and the dGPU 110 via OS 204 to implement a power management scheme. More specifically, the hybrid driver 202 is configured to transmit advanced power control interface (ACPI) methods to OS 204. The OS 204 may then issue commands to the iGPU 106 and to the dGPU 110 through an iGPU driver 206 and a dGPU driver 210, respectively. iGPU driver 206 and dGPU driver 210 are configured to communicate via an interface module 208, as directed by the OS 204. For example, hybrid driver 202 may cause the HGS 200 to operate in one of several operational modes so that the power consumption of the iGPU 106 and the dGPU 110 may be efficiently managed, as described in greater detail below in FIG. 3.

Figure 3:
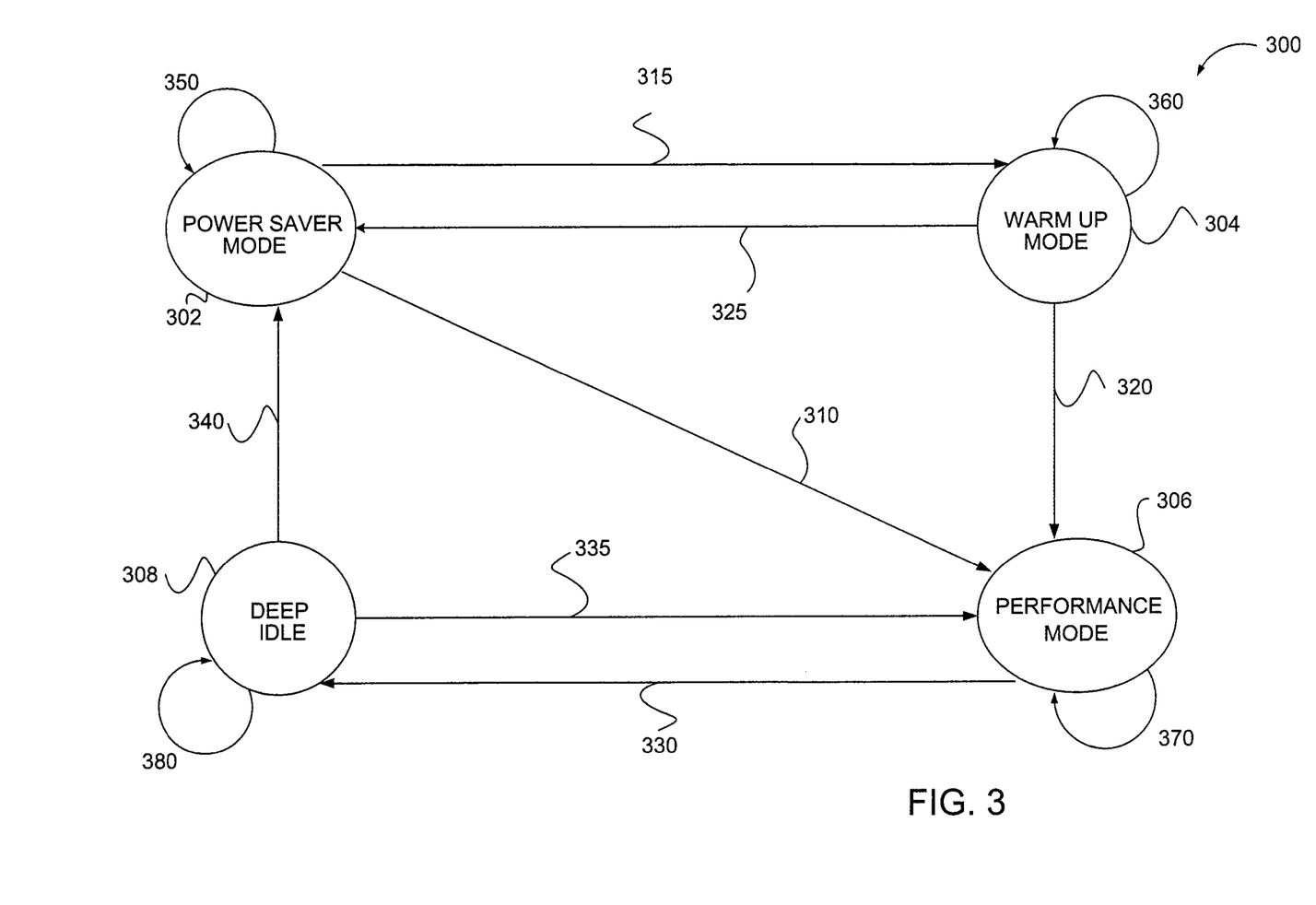
FIG. 3 is a conceptual diagram of various operational states of a hybrid graphics system, according to one embodiment of the invention.

FIG. 3 is a conceptual diagram 300 of various operational modes of HGS 200, according to one embodiment of the invention. As shown, the operational modes of HGS 200 include a performance mode 302, a deep idle mode 304, a power saver mode 306, and a warm up mode 308. The hybrid driver 202 configures the iGPU 106 and the dGPU 110 to implement these operational modes in order to meet a range of possible operational requirements of the HGS 200.

When implementing power saver mode 302, hybrid driver 202 powers off the dGPU 106, and causes graphics processing operations to be performed on the iGPU 106. Power saver mode 302 may be implemented when high-quality graphics processing operations are not required, and additional power conservation is a high priority.

When implementing warm up mode 304, the hybrid driver 202 begins to power on the dGPU 106, and may begin to load the dGPU driver 210 into the OS 204. Warm up mode 304 may be implemented when the hybrid driver 202 anticipates that high-quality graphics processing operations may be requested.

When implementing performance mode 306, the hybrid driver 202 powers off the iGPU 106 and causes graphics processing operations to be performed on the dGPU 110. Performance mode 306 may be implemented when performing high-quality graphics processing operations is a high priority and power conservation is a low priority.

When implementing deep idle mode 308, the hybrid driver 202 causes the dGPU 110 to enter a low power state, and causes graphics processing operations to be performed on the iGPU 106. Deep idle mode 308 may be implemented when high-quality graphics processing operations are not required, and reducing power consumption is a high priority.

Transitions between each of these operational modes are managed by the hybrid driver 202. Transitions may be triggered when certain system events occur, such as the removal of the power cord from the computing device, the insertion of a DVD, the flipping of a switch by a user, a user selection of a new mode via a graphical operational mode selection mechanism, or other system events. In one embodiment, the user may configure the system events to which the hybrid driver 202 responds.

Additionally, transitions between a first pair of operational modes may be triggered by different system events than transitions between a second pair of operational modes. For example, a transition from performance mode 306 to deep idle mode 308 may be made in response to the user flipping a switch; whereas, a transition from power saver mode 302 to warm up mode 304 may be made in response to the user positioning a mouse cursor proximate to a graphical operational mode selection mechanism.

When transitioning between certain operational modes, the hybrid driver 202 may transfer client applications (clients) executing on one GPU to the other GPU. In one embodiment, clients executing operations on the iGPU 106 may be transferred to the dGPU 110, and clients executing on the dGPU 110 may be transferred to the iGPU 106. For example, when transitioning from power saver mode 302 to performance mode 306, clients executing operations on the iGPU 106 are transferred to the dGPU 110. These clients may then execute operations on the dGPU 110. In alternative embodiments, when transitioning between other operational modes, the hybrid driver 202 may not transfer clients between GPUs. For example, when the HGS 200 transitions from power saver mode 302 to warm up mode 304, the client applications executing operations on the iGPU 106 continue to do so, and are not transferred to the dGPU 110.

Some clients may be transferred between GPUs without causing a system failure or data loss. However, other clients cannot be transferred between GPUs while actively executing operations. The hybrid driver 202 includes a "white list" that identifies the clients that can be transferred successfully between GPUs without resulting in any data loss. When a system event triggers a transition between operational modes that causes clients to be transferred, the hybrid driver 202 performs a "transition check" to determine whether each client currently executing operations is included on the white list. If each client currently executing operations is included on the white list, then the transition check passes, and hybrid driver 202 allows the transition and transfers the clients to the other GPU. If one or more of the clients is not included on the white list, then the transition check fails. In one embodiment, the user is notified of any clients that are not included on the white list. The user may then terminate or abort the operation of those clients, and the transition may be allowed for the other clients.

When the HGS 200 operates in power saver mode 302, clients execute operations on the iGPU 106, and the dGPU 110 is powered off. In power saver mode, the dGPU 110 is not accessible via the system bus, and the dGPU driver 210 is not loaded in the OS 204. Processing operations are executed by only the iGPU 106. As shown in FIG. 3, the hybrid driver 202 may transition the HGS 200 from power saver mode 302 directly to performance mode 306 along path 310 when triggered by one of the events associated with path 310. Events associated with path 310 may include, for example, the user flipping a switch that selects a high-performance operational mode, the user selecting a high-performance mode via a graphical operational mode selection mechanism, the user initiating a high-definition video game, among others. When an event associated with path 310 is detected, the hybrid driver 202 performs a transition check for the clients executing operations on the iGPU 106 to determine whether each of the clients is included on the white list. If each of the clients currently executing operations on the iGPU 106 are included on the white list (e.g., the transition check passed), then the dGPU 110 is powered on and attached to the system bus. The dGPU driver 210 is loaded into the OS 204, and the clients are transferred from the iGPU 106 to the dGPU 110. The iGPU 106 is then powered off.

The HGS 200 may also transition from power saver mode 302 to warm up mode 304 along path 315 when the hybrid driver 202 anticipates certain system events associated with path 315. For example, the hybrid driver 202 may detect that the user has positioned a mouse cursor proximate to a graphical operational mode selection mechanism. In response, the hybrid driver 202 transitions to warm up mode 304 and begins to warm up the dGPU 110. As is known, a dGPU 110 may require some amount of "warm-up" time, during which the dGPU 110 does not execute operations associated with the client applications. Because a transition to performance mode 306 is likely when the user actives the graphical operational mode selection mechanism when in power saver mode 302, the HGS 200 and the hybrid driver 202 may anticipate the transition to performance mode 306 and begin warming up the dGPU 110 before a request for performance mode 306 is actually received. When HGS 200 transitions to dGPU warm up mode 304, the hybrid driver 202 powers on the dGPU 110. The clients currently executing operations on the iGPU 106 are not to be transferred to the dGPU 110 and graphics processing operations continue to be executed on the iGPU 106. No transition check is necessary when transitioning from power saver mode 302 to warm up mode 304 because no clients are transferred.

The HGS 200 operates in warm up mode 304 until a system event associated with path 320 triggers a transition to performance mode 306 or a system event associated with path 325 triggers a transition to power saver mode 302. For example, a system event associated with path 325 may include a signal that indicates that an amount of time has elapsed since entering warm up mode 304, and a system event associated with path 320 may include a user selection of a high-performance mode. If a transition to performance mode 306 is triggered (path 320), then the hybrid driver 202 performs a transition check for the clients executing operations on the iGPU 106. If the transition check passes, then the hybrid driver 202 transitions the HGS 200 to performance mode 306. The hybrid driver 202 powers on the dGPU 110, attaches the dGPU 110 to the system bus, loads the dGPU driver 210 into the OS 204, transfers the clients from the iGPU 106 to the dGPU 110, and powers off the iGPU 106. If the transition check fails, the HGS 200 remains in warm up made 304. If a transition to power saver mode 302 is triggered (path 325), then the hybrid driver 202 returns the HGS 200 to power saver mode 302 and the dGPU 110 is powered off. A transition check is not required because clients are not transferred to the dGPU 110.

When the HGS 200 operates in performance mode 306, processing operations are performed on the dGPU 110 and the iGPU 106 is powered off. The HGS 200 operates in performance mode 306 until a system event associated with path 330 triggers a transition to deep idle mode 308. Examples of system events associated with path 330 include, the user flipping a switch that selects a high-performance operational mode, the user selecting a high-performance mode via a graphical operational mode selection mechanism, the user initiating a high-definition video game, among others. When a transition to deep idle mode 308 is triggered, the hybrid driver 202 performs a transition check for the clients executing operations on the dGPU 110. If the transition check is passed, then the hybrid driver 202 powers on the iGPU 106, transfers the clients to the iGPU 106, and powers down the dGPU 110. Powering down the dGPU 110 is different than powering off the dGPU 110. When powered-down, the dGPU 110 remains powered on, but is placed in a low-power state. The dGPU 110 remains visible to the OS 204 when powered-down and may still be accessed via the system bus. However, the dGPU 110 does not perform processing operations. As described above, a dGPU 110 oftentimes requires a "warm up" time to be operational when transitioning from a powered-off state. Operating the HGS 200 in a deep idle mode 380, therefore, advantageously allows the HGS 200 to transition back to performance mode 306 requiring little or no warm-up time.

The HGS 200 operates in dGPU deep idle mode 308 until a system event associated with path 335 triggers a transition to performance mode 306 or a system event associated with path 340 triggers a transition to power saver mode 302. In one embodiment, the system events associated with path 335 are the same as those associated with path 310. If a transition to performance mode 306 is triggered (path 335), a transition check is preformed on the clients currently executing operations on the iGPU 106. If the transition check passes, the hybrid driver 202 transitions the HGS 200 to performance mode 306. The dGPU 110 is powered to full power and the clients are transferred from the iGPU 106 to the dGPU 110. The iGPU 106 may then be powered off. Importantly, the transition from deep idle mode 308 to performance mode 306 is performed without requiring a re-enumeration of the dGPU 110, without requiring a re-initialization of the dGPU 110, and without reloading a driver associated with the dGPU 110. If the transition check fails, the HGS 200 continues to operation in deep idle mode 308.

When in deep idle mode 308, if a transition to power saver mode 302 is triggered (path 340), then the hybrid driver 202 transitions the HGS 200 to power saver mode 306 along path 340. A transition check is not required because the clients are not transferred (i.e., the clients are already executing on the iGPU 106). In one embodiment, a transition to power saver mode 302 along path 340 is triggered when the dGPU 110 is "grossly idle." The dGPU 110 may be grossly idle when no clients executing on the iGPU 106 require high-performance processing for some amount of time. The hybrid driver 202 may wait for the amount of time, and if no high-performance operations are requested along path 335, the hybrid driver 202 may then transition the HGS 200 to power saver mode 302.

When the HGS 200 operates in power saver mode 302, warm-up mode 304, performance mode 306, or deep idle mode 308, the HGS 200 remains in each of these modes via return paths 350, 360, 370, and 380, respectively, until the hybrid driver 202 detects a relevant system event, as described above.

Figure 4:
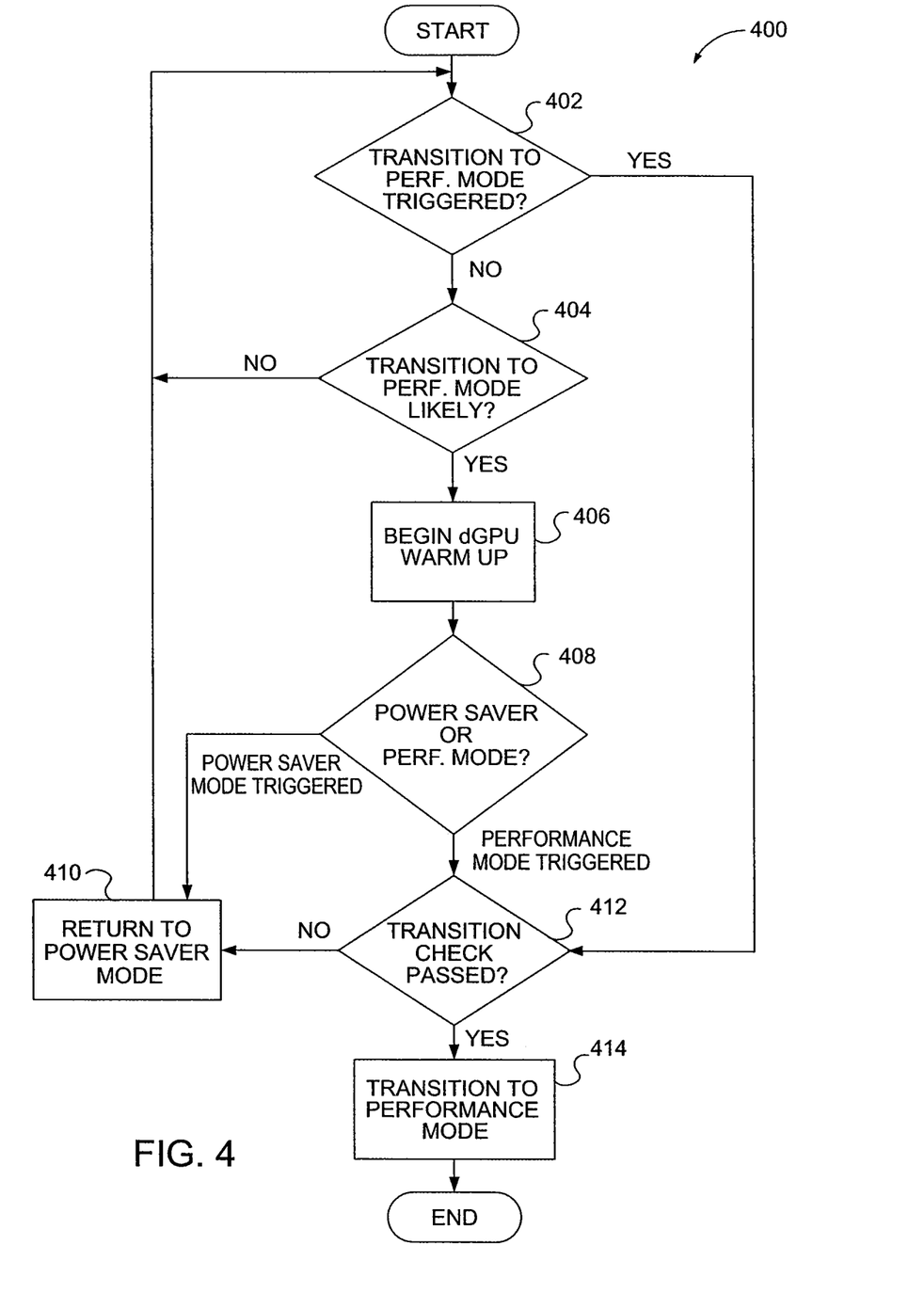
FIG. 4 is a flowchart of method steps for transitioning a hybrid graphics system from power saver mode to performance mode, according to one embodiment of the invention.

FIG. 4 is a flowchart of method steps for transitioning the hybrid graphics system 200 from power saver mode 302 to performance mode 306, according to one embodiment of the invention. Persons skilled in the art will understand that, even though the method 400 is described in conjunction with the systems of FIGS. 1-3, any system configured to perform the method steps, in any order, is within the scope of the present invention.

As shown, the method 400 begins at step 402, where the hybrid driver 202 detects whether a system event is received that indicates that a transition to performance mode 306 is triggered. Such system events can be triggered by, for example, a user flipping a switch that selects a high-performance operational mode, the user selecting a high-performance mode via a graphical operational mode selection mechanism, the user initiating a high-definition video game, among others. If the hybrid driver 202 detects such a system event, then the method 400 proceeds to step 412. This course for the method 400 corresponds to path 310 of FIG. 3. However, if the hybrid driver 202 does not detect any such system event, then the method 400 proceeds to step 404, where the hybrid driver 202 detects whether a system event that indicates that a transition to performance mode is likely to be received. If no such system event is detected, then the method 400 returns to step 402. However, if the hybrid driver 202 detects such a system event, corresponding to path 315 of FIG. 3, then the method 400 proceeds to step 406, where the hybrid driver 202 transitions to dGPU warm up mode 304 and causes the dGPU 110 to begin warming up.

At step 408, the hybrid driver 202 detects whether a system event is received that triggers either a transition to power saver mode 302, corresponding to path 325 of FIG. 3, or a transition to performance mode 306, corresponding to path 320 of FIG. 3. If a system event is received that triggers a transition to power saver mode 302, then the method 400 proceeds to step 410, where the hybrid driver 202 returns the HGS 200 to power saver mode 302. The method 400 then returns to step 402. If, at step 408, a system event is received that triggers a transition to performance mode 606, then the method 400 proceeds directly to step 412.

At step 412, the hybrid driver 202 performs a transition check for the various clients executing operations on the iGPU 106. If the transition check passes, meaning that each client executing operations on the iGPU 106 is included on the "white list," then the method 400 proceeds to step 414. At step 414, the hybrid driver 202 transitions the HGS 200 to performance mode 306, where the hybrid driver 202 causes the operations associated with the clients to execute operations on the dGPU and cause the iGPU to be powered off. If, at step 412, the transition check fails, then the method 400 returns to power saver mode 302, as described above.

Figure 5:
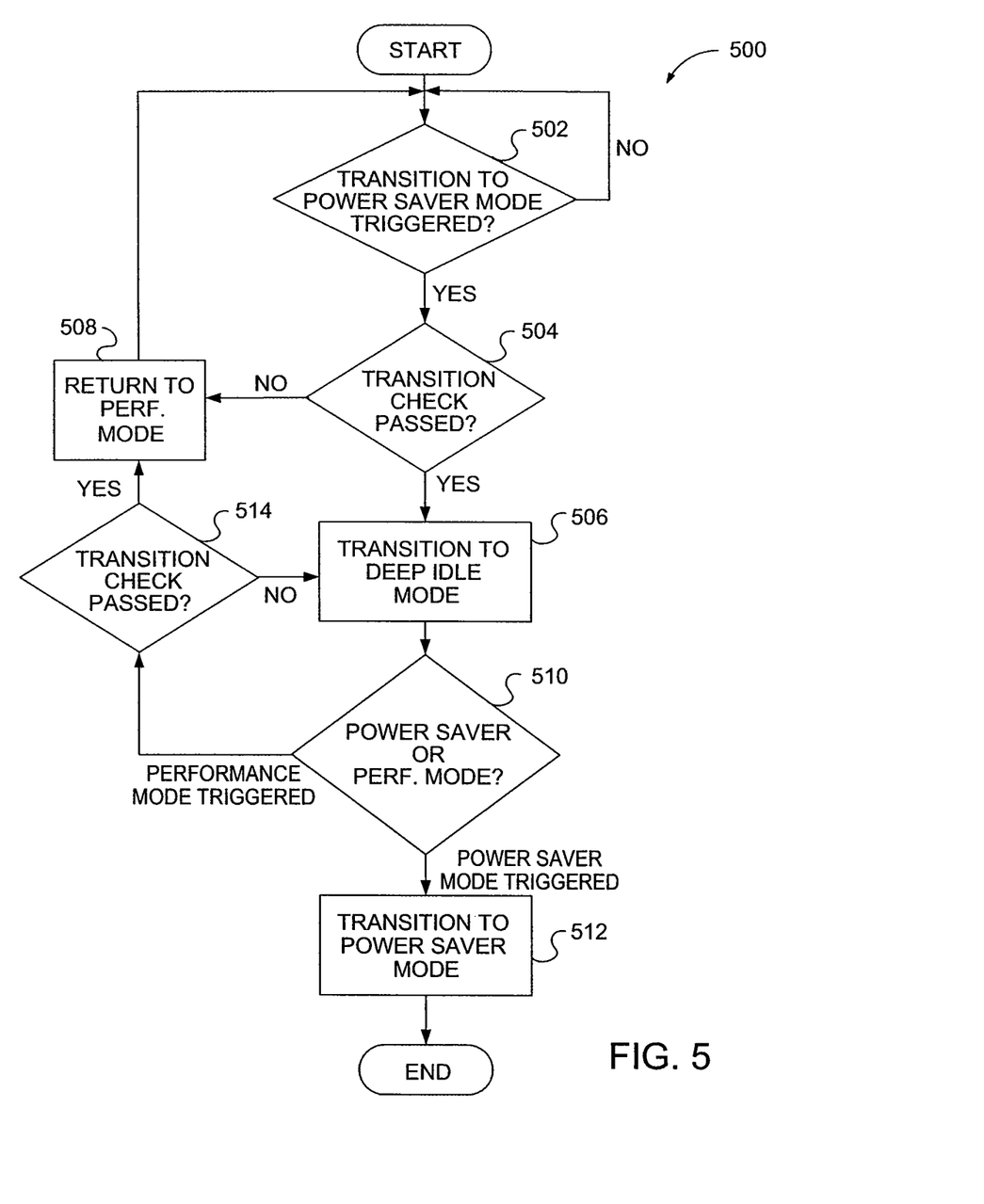
FIG. 5 is a flowchart of method steps for transitioning a hybrid graphics system from performance mode to power saver mode, according to one embodiment of the invention.

FIG. 5 is a flowchart of method steps for transitioning the hybrid graphics system 200 from performance mode 306 to power saver mode 302, according to one embodiment of the invention. Persons skilled in the art will understand that, even though the method 500 is described in conjunction with the systems of FIGS. 1-3, any system configured to perform the method steps, in any order, is within the scope of the present invention.

As shown, the method 500 begins at step 502, where the hybrid driver 202 detects whether a system event is received that indicates a transition to power saver mode 302, corresponding to path 330 of FIG. 3. If no such system event is detected, the method 500 repeats step 502. If the hybrid driver 202 detects such a system event, then the method 500 proceeds to step 504.

At step 504, the hybrid driver 202 performs a transition check for the various clients executing operations on the dGPU 110. If the transition check fails, then the method 500 advances to step 508 and the HGS 200 remains in performance mode 306. The method 500 then returns to step 502, described above. If the transition check passes, then the method 500 advances to step 506, where the hybrid driver 202 transitions the HGS 200 to deep idle mode 308.

At step 510, the hybrid driver 202 determines whether a system event is received that either triggers a transition to power saver mode 302, corresponding to path 340 of FIG. 3, or triggers a transition to performance mode 306, corresponding to path 335 of FIG. 3. If a transition to power saver mode 302 is triggered, meaning that the dGPU is grossly idle for an amount of time, then the method 500 advances to step 512, where the hybrid driver 202 transitions the HGS 200 into power saver mode 302. The dGPU 110 is powered off and removed from the system bus, and the dGPU driver 210 is removed from the OS 204. A transition check is not required when transitioning from deep idle mode 308 to power saver mode 302 because the operations associated with the client applications are already executing on the iGPU when the HGS 200 is in deep idle mode 308.

Referring back to step 510, if a transition to performance mode 306 is triggered, then the method 500 proceeds to step 514, where the hybrid driver 202 performs a transition check on the various clients executing operations on the iGPU 106. If the transition check passes, then the hybrid driver 202 causes the HGS 200 to transition to performance mode 306 and the method 500 proceeds to step 508, described above. If the transition check fails, then hybrid driver 202 causes the HGS 200 to continue to operate in deep idle mode 308 and the method returns to step 506.

Figure 6:
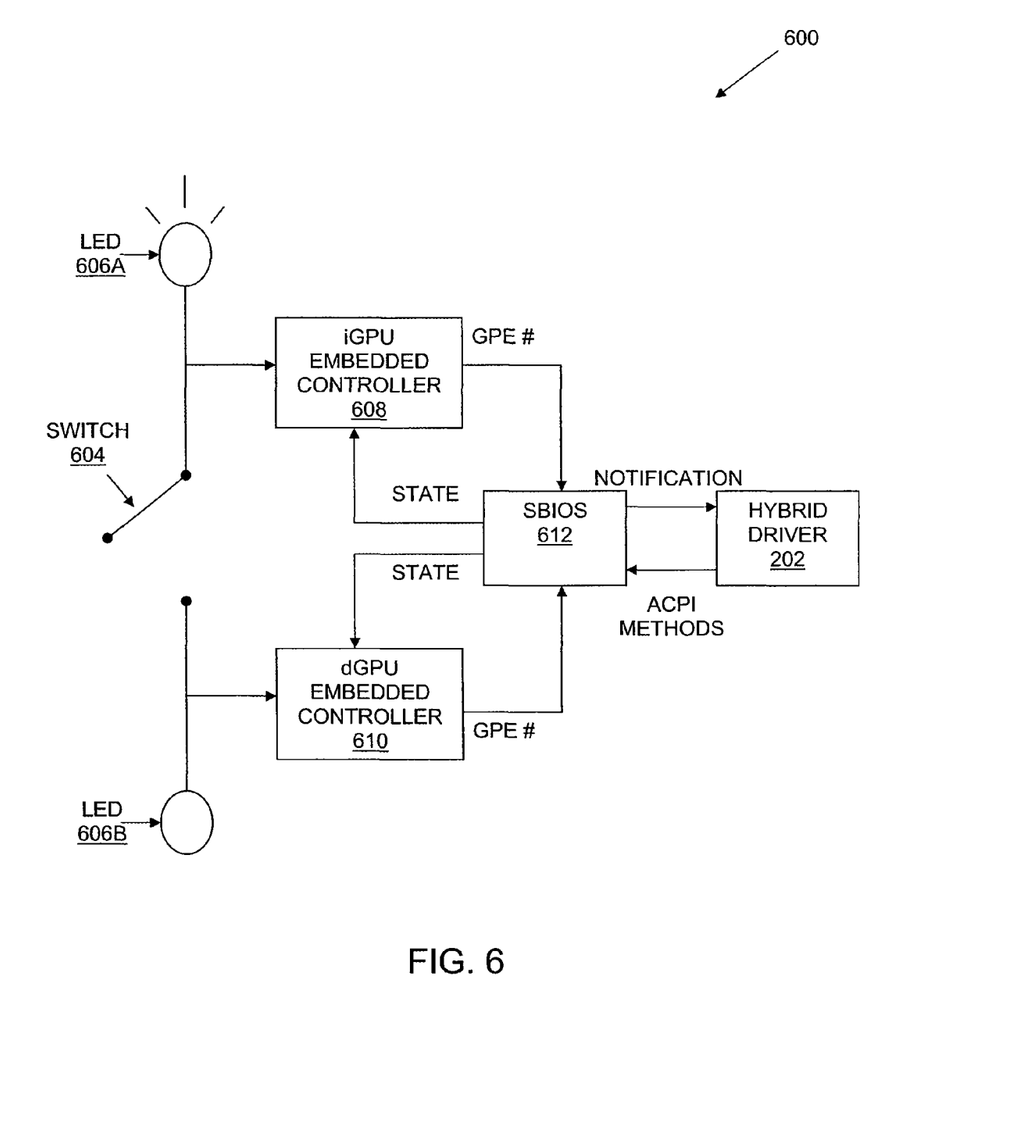
FIG. 6 is a block diagram of a switching mechanism used to toggle between operational modes in a hybrid graphics system, according to one embodiment of the invention.

FIG. 6 is a block diagram of a switching mechanism 600 used to toggle between operational modes in the hybrid graphics system 200, according to one embodiment of the invention. As shown, the switching mechanism 600 includes a switch 604, light-emitting diodes (LEDs) 606A, 606B, an iGPU embedded controller 608, a dGPU embedded controller 610, a system basic input/output system (SBIOS) 612, and the hybrid driver 202. The LEDs 606A, 606B indicate the current position of the switch 604. For example, when the iGPU is powered on the dGPU is powered off, then LED 606A is illuminated. Alternatively, when the dGPU is powered on the iGPU is powered off, then LED 606B is illuminated.

Switch 604 may be toggled by a user who wishes to change the operational state of the HGS 200. Persons skilled in the art will recognize that the switch 604 may be any type of selection device, which may include physical switches, such as toggles, sliders, buttons, a mouse, or touchpad devices, and may also include switches implemented in a software program or a user interface.

In one embodiment, toggling of the switch 604 may be interpreted by the hybrid driver 202 as a system event, and may trigger a transition between operational modes. However, the hybrid driver 202 may not be able to transfer clients between the iGPU 106 and the dGPU 110 for the reasons described above in FIG. 3 (e.g., transition check fails). Therefore, the switch 604 may indicate the operational mode that the user prefers, however, toggling the switch to a particular direction does not necessarily result in an immediate transition between operational modes.

For example, when graphics processing operations are executed on the dGPU 110, and the user wishes to perform graphics processing operations on the iGPU 106, the user may toggle the switch 604 to indicate this preference. The iGPU embedded controller 608 and the dGPU embedded controller 610 are notified of the preference of the user. The iGPU embedded controller 608 and the dGPU embedded controller 610 transmit general purpose event (GPE) signals to the system basic input/output system (SBIOS) 612. The SBIOS 612 then notifies the hybrid driver 202 that a transition is requested. The hybrid driver 202 examines the clients currently executing operations on the dGPU 110 and determines whether each of these clients can be transferred to the iGPU 106. If each of the clients can be transferred (e.g., each client is included in the white list), then the hybrid driver 202 transmits ACPI methods to the SBIOS 612, which then executes the ACPI methods with the iGPU embedded controller 608 and the dGPU controller 610 to power on the iGPU 106 and power down the dGPU.

In sum, a hybrid driver coordinates the cooperation of an integrated graphics processing unit (iGPU) and a discrete graphics processing unit (dGPU) in a hybrid graphics system (HGS). The hybrid driver implements multiple low-power consumption/low-performance graphics processing modes (deep idle mode, power saver mode, and warm-up mode), and a high-power-consumption/high-performance graphics processing mode (performance mode). When the HGS is operating in deep idle mode, the iGPU is active and the dGPU is powered down to a low-power level. When the HGS is in power saver mode, the iGPU is active and the dGPU is powered off. When the HGS is in warm-up mode, the iGPU is active and the dGPU is powered on and is warming up. When the HGS is in performance mode, the dGPU is active and the iGPU is powered off. The hybrid driver manages transitions between the different operational modes by transferring client applications between the iGPU and the dGPU. In order to transfer clients, the hybrid driver checks a "white list" that includes the clients that are able to be transferred without causing a system failure or data loss. If each active client is listed on the white list, then the HGS transitions between operational modes.

Advantageously, a hybrid graphics system that includes both an iGPU and a dGPU may be efficiently managed by a hybrid driver to provide a system that is capable of both high-performance processing and low power consumption. When speed and precision are priorities, the hybrid driver transfers graphics processing tasks to the dGPU, and powers off the iGPU. When low power consumption is a priority, the hybrid driver transfers graphics processing tasks to the iGPU, and either powers down the dGPU to a low-power state or powers off the dGPU. The hybrid driver may also anticipate a transition to performance mode and begin to warm up the dGPU before an actual request to enter performance mode is received. In this fashion, the total time needed to transition to performance mode is decreased.

While the forgoing is directed to embodiments of the present invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention. Therefore, the scope of the present invention is determined by the claims that follow.

What is claimed is:

1. A method for transitioning a computing device from a first operational mode to a second operational mode, the method comprising:
   causing operations associated with one or more client applications to be executed in the first operational mode, wherein, in the first operational mode, operations are executed on a first processor while a second processor is powered off;
   detecting a first system event that signals a transition from the first operational mode to the second operational mode, wherein, in the second operational mode, operations are executed on the second processor while the first processor is in a low-power state;
   determining that each client application included in a first subset of the one or more client applications is not included in a list of client applications that can be transferred from the first processor to the second processor without resulting in data loss;
   in response to determining that each client application included in the first subset is not included in the list, providing a user notification indicating that the client applications included in the first subset are not included in the list;
   determining that each client application included in a second subset of the one or more client applications is included in the list of client applications, wherein the second subset does not include client applications included in the first subset;
   in response to determining that each client application included in the second subset of the one or more client applications is included in the list:
   causing the second processor to power on, transferring the client applications included in the first subset from the first processor to the second processor for execution in the second operational mode,
causing the first processor to enter a low-power state,
determining that the first processor has been in the low-power state for a threshold amount of time, and
causing the first processor to power off.

2. The method of claim 1, wherein the second operational mode comprises a deep idle mode where the first processor appears enabled within the computing device.

3. The method of claim 1, further comprising the steps of:
detecting a second system event that signals a transition from the second operational mode back to the first operational mode;
powering up the first processor from the low-power state to a full-power state;
transferring the client applications included in the second subset from the second processor to the first processor; and
powering off the second processor.

4. The method of claim 3, wherein the transition from the second operational mode back to the first operational mode is performed without requiring a re-enumeration of the first processor within the computing device, without requiring a re-initialization of the first processor within the computing device, and without reloading a driver associated with the first processor.

5. The method of claim 1, wherein the first system event is caused by an end-user.

6. The method of claim 5, wherein the first system event comprises the end-user toggling a switch that conveys a request to transition from the first operational mode to the second operational mode.

7. The method of claim 5, wherein the first system event includes determining that a user activated a graphical operational mode selection mechanism but has not requested operation in the second operational mode.

8. The method of claim 7, further comprising causing the second processor to power on in response to determining that the user activated the graphical operational mode selection mechanism and prior to determining that each client application included in the second subset is included in the list.

9. The method of claim 1, wherein the second system event is generated by the computing device.

10. The method of claim 1, wherein the first processor is a discrete graphics processing unit (dGPU) and the second processor is an integrated graphics processing unit (iGPU).

11. The method of claim 10, wherein the dGPU is a higher-performance graphics processing unit than the iGPU and consumes more power than the iGPU.

12. The method of claim 1, wherein the first processor and the second processor are controlled using advanced power control interface (ACPI) signals.

13. A non-transitory computer-readable medium storing instructions that, when executed by a processor, cause a computing device to transition from a first operational mode to a second operational mode, by performing the steps of:
causing operations associated with one or more client applications to be executed in the first operational mode, wherein, in the first operational mode, operations are executed on a first processor while a second processor is powered off;
detecting a first system event that signals a transition from the first operational mode to the second operational mode, wherein, in the second operational mode, operations are executed on the second processor while the first processor is in a low-power state;
determining that each client application included in a first subset of the one or more client applications is not included in a list of client applications that can be transferred from the first processor to the second processor without resulting in data loss;
in response to determining that each client application included in the first subset is not included in the list, providing a user notification indicating that the client applications included in the first subset are not included in the list;
determining that each client application included in a second subset of the one or more client applications is included in the list of client applications, wherein the second subset does not include client applications included in the first subset;
in response to determining that each client application included in the second subset of the one or more client applications is included in the list:
causing the second processor to power on,
transferring the client applications included in the first subset from the first processor to the second processor for execution in the second operational mode,
causing the first processor to enter a low-power state,
determining that the first processor has been in the low-power state for a threshold amount of time, and
causing the first processor to power off.

14. The non-transitory computer-readable medium of claim 13, wherein the second operational mode comprises a deep idle mode where the first processor appears enabled within the computing device.

15. The non-transitory computer-readable medium of claim 13, further comprising the steps of:
detecting a second system event that signals a transition from the second operational mode back to the first operational mode;
powering up the first processor from the low-power state to a full-power state;
transferring the client applications included in the second subset from the second processor to the first processor; and
powering off the second processor.

16. The non-transitory computer-readable medium of claim 15, wherein the transition from the second operational mode back to the first operational mode is performed without requiring a re-enumeration of the first processor within the computing device, without requiring a re-initialization of the first processor within the computing device, and without reloading a driver associated with the first processor.

17. The non-transitory computer-readable medium of claim 13, wherein the first processor is a discrete graphics processing unit (dGPU) and the second processor is an integrated graphics processing unit (iGPU).

18. A system configured to transition from a first operational mode to a second operational mode, comprising:
a first processor;
a second processor; and
a memory that includes a hybrid driver configured to:
cause operations associated with one or more client applications to be executed in the first operational mode, wherein, in the first operational mode, operations are executed on a first processor while a second processor is powered off;
detect a first system event that signals a transition from the first operational mode to the second operational mode, wherein, in the second operational mode, operations are executed on the second processor while the first processor is in a low-power state;

determine that each client application included in a first subset of the one or more client applications is not included in a list of client applications that can be transferred from the first processor to the second processor without resulting in data loss;

in response to determining that each client application included in the first subset is not included in the list, provide a user notification indicating that the client applications included in the first subset are not included in the list;

determine that each client application included in a second subset of the one or more client applications is included in the list of client applications, wherein the second subset does not include client applications included in the first subset;

in response to determining that each client application included in the second subset of the one or more client applications is included in the list:

cause the second processor to power on, transfer the client applications included in the first subset from the first processor to the second processor for execution in the second operational mode, cause the first processor to enter a low-power state, determine that the first processor has been in the low-power state for a threshold amount of time, and cause the first processor to power off.

* * * * *